2 Sheets—Sheet 1.
H. W. F. CARSTENS.
MECHANISM FOR PROPELLING VEHICLES.
No. 178,995. Patented June 20, 1876.
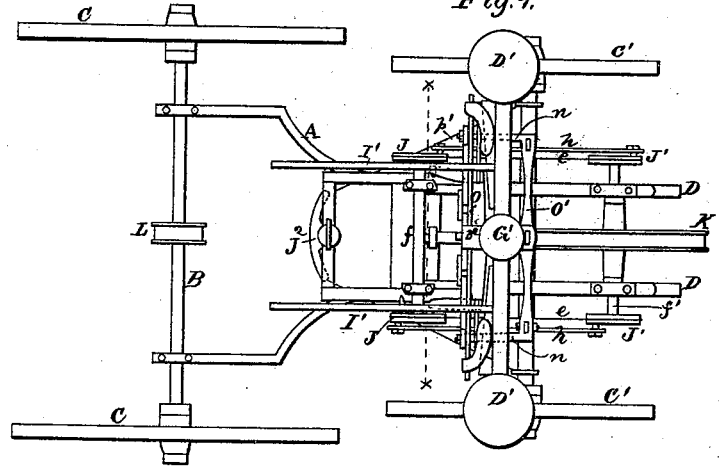
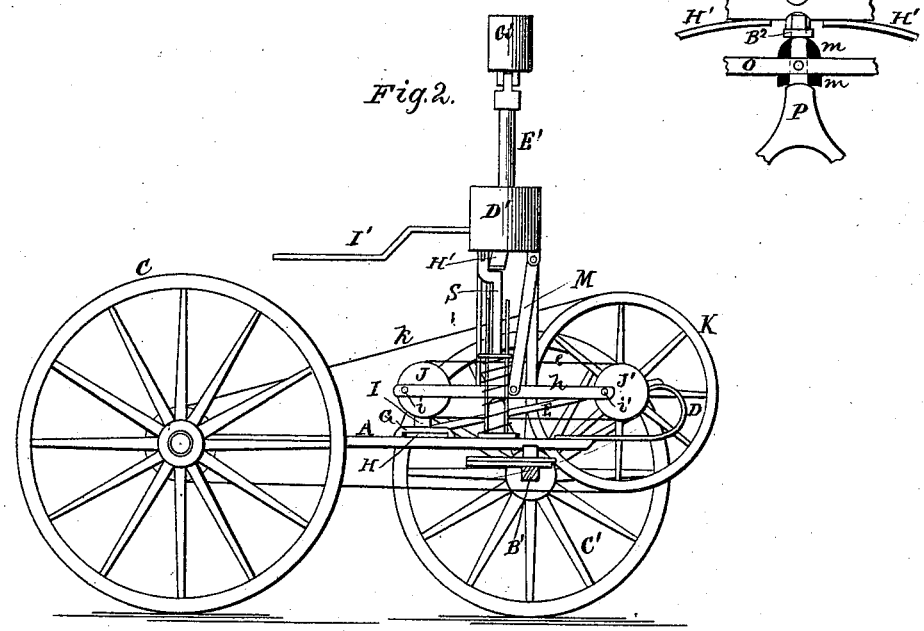
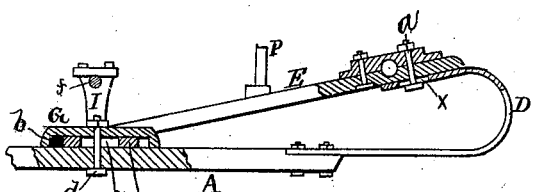
WITNESSES
Henry N. Miller
M. L. Stowell
INVENTOR
Heinrich W. F. Carstens
By Alexander Mason
Attorneys 2 Sheets—Sheet 2.

H. W. F. CARSTENS.
MECHANISM FOR PROPELLING VEHICLES.

No. 178,995. Patented June 20, 1876.

WITNESSES
Henry N. Miller
M. L. Stowell.

INVENTOR
Heinrich W. F. Carstens
By Alexander Mason
Attorneys

UNITED STATES PATENT OFFICE.

HEINRICH W. F. CARSTENS, OF BRESLAU, NEW YORK.

IMPROVEMENT IN MECHANISMS FOR PROPELLING VEHICLES.

Specification forming part of Letters Patent No. 178,995, dated June 20, 1876; application filed May 18, 1876.

*To all whom it may concern:*

Be it known that I, HEINRICH W. F. CARSTENS, of Breslau, in the county of Suffolk, and in the State of New York, have invented certain new and useful Improvements in Land Conveyances; and do hereby declare that the following is a full, clear, and exact description thereof, reference being had to the accompanying drawings, and to the letters of reference marked thereon, making a part of this specification.

The nature of my invention consists in the construction and arrangement of a power for running street-cars, carriages, and other land conveyances, as will be hereinafter more fully set forth.

In order to enable others skilled in the art to which my invention appertains to make and use the same, I will now proceed to describe its construction and operation, referring to the annexed drawings, in which—

Figure 3:
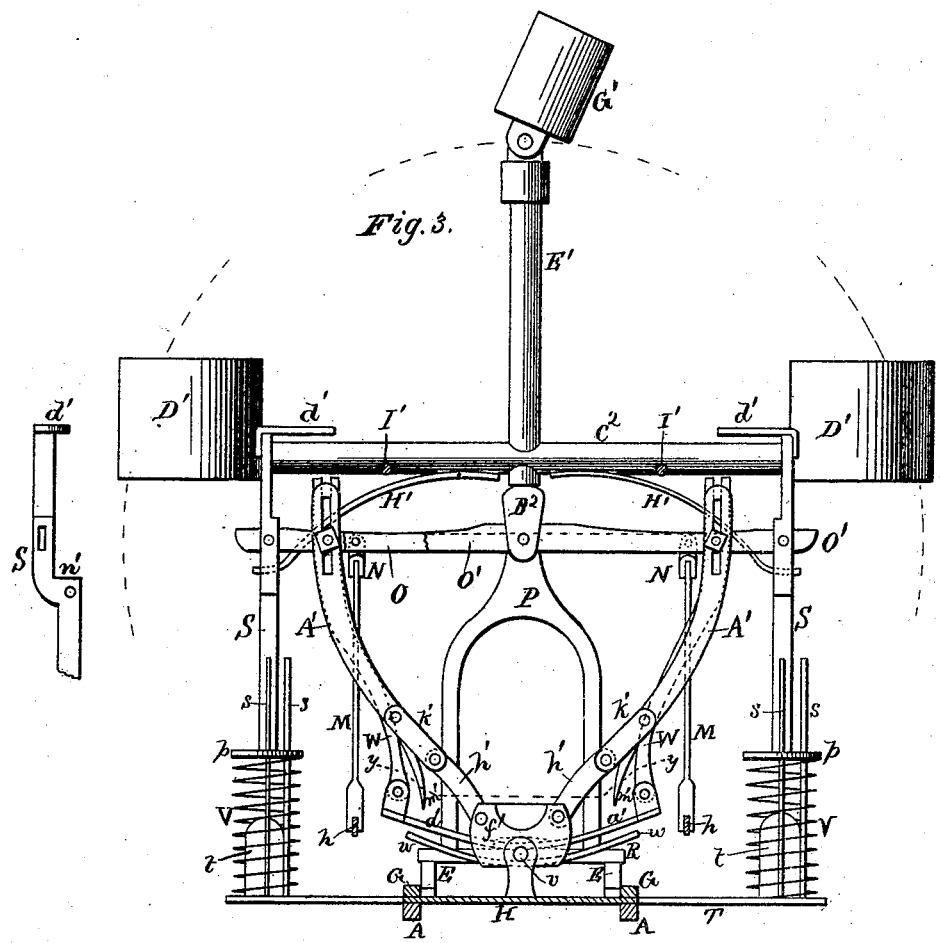
Figure 4:
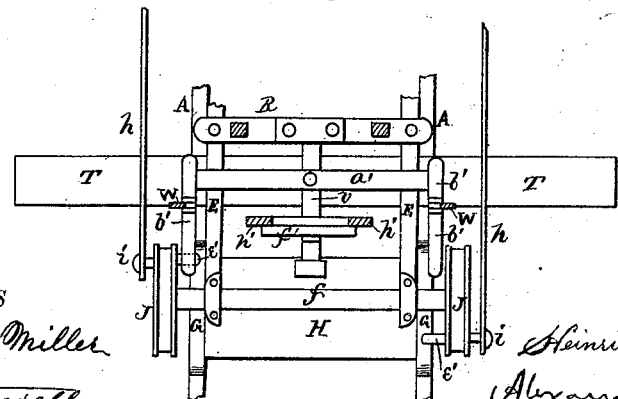

Figure 1 is a plan view of a carriage embodying my invention. Fig. 2 is a side elevation of the same. Fig. 3 is an enlarged transverse vertical section through the line $x\ x$ of Fig. 1. Fig. 4 is a horizontal section of a part thereof through the line $y\ y$ of Fig. 3.

A represents a skeleton frame, of any suitable form and dimensions, supported at its rear by the hind axle B, having the wheels C C secured on its ends. The front end of the frame is, by the usual fifth-wheel, connected to and supported by the front axle $B^1$ and the front wheels $C^1$. To each side of the frame A, at the front end, is secured a spring, D, which extends forward, and is bent upward and backward, and then connected to the front end of a bar, E. This connection is made by a bolt, $a$, passing upward through a slot, $x$, in the end of a spring, and then into or through the beam, allowing sufficient sliding movement of the parts. The rear ends of the bars E E are rigidly attached to a plate or platform, H, which rests upon the side bars of the frame A, under guards G G, secured to said side bars. Between the rear edge of the platform and each guard is inserted a rubber cushion, $b$, and the plate or platform is prevented from moving laterally by a bolt, $d$, at each end passing through the side bar of the frame, and through a slot, $y$, in the platform. This platform H, with the bars E E, springs D D, and cushions $b\ b$, form a yielding bed, upon which the entire operating mechanism is supported. On the platform H is secured a bar, I, the ends of which are curved or turned upward, and are formed or provided with suitable boxes or bearings for a shaft, $f$, having a pulley, J, on each end. These pulleys are, by cords or belts $e\ e$, connected with similar pulleys $J^1$ on the ends of a shaft, $f'$, which has its bearings in boxes formed on or attached to the front ends of the side bars E E. The pulleys J $J^1$ are, on their outer sides, provided with wrist-pins $i\ i'$, respectively, and the wrist-pins on each side of the vehicle are connected by a bar, $h$, placed on them, as shown. On the front shaft $f'$, between the bars E E, is secured a wheel or large pulley, K, which is, by a belt, $k$, connected with a pulley, L, on the hind axle B, and by which means motion is communicated to said axle. The center of each connecting-bar $h$ is straddled by the lower forked end of a bar or pitman, M, which is pivoted to the bar $h$ by a bolt, as shown. The upper end of the bar M is pivoted in a link, N, and this link is pivoted in a slot or mortise in the end of a walking-beam, O, the two pivots passing through the links being at right angles with each other. The walking-beam O is placed on the upper end of a standard, P, attached to a cross-bar, R, which is secured on the side bars E E. Above and below the walking-beam on the standard are rubber cushions $m\ m$, to prevent all noise of said beam. From the upper end of the standard P extends a horizontal arm rearward for a suitable distance, and on this arm is pivoted another walking-beam, O', and the two beams O' O are connected by means of arms $n\ n$ projecting at right angles from the ends of the beam O. The ends of the beam O' extend beyond said arms, and each end is passed into and pivoted in a slot or mortise in the upper end of a vertical plunger rod or bar, S, as shown. This rod or bar has a disk or plunger, $p$, attached to its lower end, which moves upon and is guided by vertical rods $s\ s$, attached to a cross-bar, T, laid on and secured to the front end of the frame A. Each end of this cross-bar supports a spiral spring, V, placed around the rods $s$ and around a central guide, $t$, attached to the cross-bar T.

In the center of the cross-bar R, and in a post on the platform H, is placed a rocking-shaft, $v$, on the under side of which is secured a spring, $w$, which extends far enough on each side to allow its ends to come down upon the side bars E E, as the shaft is rocked from side to side. On top of the rocking-shaft $v$ is secured a similar spring, $a'$, provided at its ends with rearwardly-extending feet $b'$, which are to operate upon pins $e'$ projecting from the inner sides of the pulleys J.

On the upper side of each foot $b'$ are suitable ears, between which is pivoted the lower end of an arm, W, the upper end of which is slotted longitudinally, and passes up over the arm $n$, that connects the two walking-beams O O'. The upper ends of the arms W are operated upon alternately at the proper times by means of foot-pieces $d'$ $d'$, attached to and projecting from the upper ends of the vertical plunger-rods S S, as shown.

On the rock-shaft $v$ is further secured a plate, $f'$, with two projecting arms, $h'$ $h'$. To the upper end of each arm $h'$ are pivoted two links, $k'$, which are fastened permanently to a bar, A'. The upper end of the bar is slotted longitudinally, and passed over the arm $n$, as shown. The lower end of each bar A' forms a downwardly-projecting spur, $m'$.

On the upper end of the standard P, and its central rearward projecting arm, is pivoted or hung a cross-bar, $B^2$, to which is secured a pipe or tube, $C^2$, and this pipe has at each end a reservoir, D', the two reservoirs being connected by said pipe, and containing a certain quantity of mercury. From the center of the pipe $C^2$ extends an upright arm, E', carrying on its upper end a pivoted case or reservoir, G', also containing mercury. To the under side of the tube $C^2$ is attached a bent flat spring, H', the ends of which are to operate on shoulders $n'$ formed on the plunger-rods S. I' I' are handles projecting rearward from the tube $C^2$, as shown.

The operation is substantially as follows: A seat is to be erected over the rear portion of the frame A, and the operator seated thereon takes hold of the arms I', and tilts the tube $C^2$ to one side, when the mercury will flow down to the lower reservoir, and that end of the spring H' will force down the plunger-rod S, and, by means of the disk $p$, compress the spring V. This downward movement of the rod S tilts the walking-beams O O', and, as the rod S continues to go down, the piece $d'$, on its upper end, strikes the upper end of the arm W, and carries the same down, thereby tilting the rock-shaft $v$. The tilting of the walking-beams in the meantime has, by means of the bars M and $h$, rotated the pulleys J J¹ sufficiently far, so that when the shaft $v$ commences to tilt the foot $b'$ will come on the pin $e'$, that projects from the pulley J, and operate thereon, so as to bring said pulleys over the dead-center. At the instant the shaft $v$ commences to tilt, the arm $n$, on the descending end of the walking-beams, strikes the bottom of the slot in the arm A', and breaks the joint between it and the arm $h'$, and the corresponding arms on the opposite side become locked by means of the spur $m'$. The mercury-tube, with reservoirs, is then tilted to the other side, when the same movements take place on that side of the vehicle, the shaft $v$, with its parts, remaining, however, stationary (locked as described) until the arms W and A' become acted upon on that side of the machine, when the locked joint is broken. By these means, therefore, a continuous rotary motion is imparted to the wheel K, and from that to the hind axle, thus propelling the vehicle.

When the operating mechanism has been thus put in motion, the mercury flowing from one reservoir to the other, and aided by the tilting of the top reservoir G', gives a sudden blow to the rod S to compress the spring V, and the recoil of this spring throws the reservoirs suddenly up again, so as to tilt them to the opposite side, and cause the mercury to flow in that direction and operate in the same manner on that side. Hence, after the operating mechanism has been started, it takes but little aid from the operator to keep it in continuous motion.

This device may be applied to street-cars, carriages, and other land conveyances.

To guide the carriage the front axle is, by rods $p'$, connected with a swiveled bar, $J^2$, to be operated upon by the feet of the operator.

In large-sized machines I may use air or water cylinders in place of the springs V to obtain the necessary recoil.

Having thus fully described my invention, what I claim as new, and desire to secure by Letters Patent, is—

1. The combination of the frame A, curved springs D D, slotted as described, the side bars E E, platform H, guards G G, and rubber cushions $b$ $b$, substantially as and for the purposes herein set forth.

2. The combination of the shafts $f$ $f'$, pulleys J J¹, with belts $e$ $e$, wrist-pins $i$ $i'$, and connecting-bars $h$ $h$, the wheel K, belt $k$, and pulley L on the hind axle B, substantially as and for the purposes herein set forth.

3. The combination, with the bars $h$ $h$, of the bars M, links N, walking-beams O O', and a mechanism for rocking said beams, as and for the purposes set forth.

4. The combination of the walking-beam O', plunger-rod S, with disk $p$, rods $s$, and spring V, as and for the purposes herein set forth.

5. The combination of the rocking-shaft $v$, springs $w$ $a'$, feet $b'$, slotted arm W, and pin $e'$ on the pulley J, as and for the purposes herein set forth.

6. The combination of the plunger-rods S, with projecting pieces $d'$ and the arms W connected to the feet $b'$, as and for the purposes herein set forth.

7. The combination of the shaft $v$, plate $f'$, with arms $h'$, links $k'$, slotted bars $A'$, with spurs $m'$, and the arms $n$ connecting the walking-beams O O', as and for the purposes herein set forth.

8. The combination of the tube $C^2$, mercury-reservoirs $D'$, spring $H'$, and the plunger-rods S, as and for the purposes herein set forth.

9. The mercury-reservoir $G'$, pivoted to the arm $E'$, projecting from the tube $C^2$, for the purposes herein set forth.

In testimony that I claim the foregoing I have hereunto set my hand this 16th day of May, 1876.

H. W. F. CARSTENS.

Witnesses:
C. L. EVERT,
M. A. STOWELL.